United States Patent
Lönnblad et al.

(10) Patent No.: US 9,554,332 B2
(45) Date of Patent: Jan. 24, 2017

(54) METHOD FOR REDUCING POWER CONSUMPTION OF A MOBILE DEVICE AND MOBILE DEVICE

(71) Applicant: Sony Mobile Communications AB, Lund (SE)

(72) Inventors: Daniel Lönnblad, Genarp (SE); Olof Zander, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

(21) Appl. No.: 14/759,832

(22) PCT Filed: Jan. 9, 2014

(86) PCT No.: PCT/EP2014/050284
§ 371 (c)(1),
(2) Date: Jul. 8, 2015

(87) PCT Pub. No.: WO2014/108461
PCT Pub. Date: Jul. 17, 2014

(65) Prior Publication Data
US 2015/0351035 A1    Dec. 3, 2015

(30) Foreign Application Priority Data
Jan. 9, 2013   (EP) ..................... 13000093

(51) Int. Cl.
*H04W 72/00*   (2009.01)
*H04W 52/02*   (2009.01)

(52) U.S. Cl.
CPC ..... *H04W 52/0241* (2013.01); *H04W 52/0245* (2013.01); *Y02B 60/50* (2013.01)

(58) Field of Classification Search
CPC   H04W 52/241; H04W 52/245; H04L 12/1877
(Continued)

(56) References Cited

U.S. PATENT DOCUMENTS 6,256,476 B1 *   7/2001   Beamish ............. H04W 52/283
                                                  340/7.36
7,149,538 B2 *   12/2006  Lindoff .............. H04W 52/367
                                                  455/522

(Continued)

FOREIGN PATENT DOCUMENTS

EP   1 679 933 A2   7/2006
EP   2 519 062 A1   10/2012

(Continued)

OTHER PUBLICATIONS

Communication with Partial European Search Report, European Application No. 13000093.8, Jun. 25, 2013.
(Continued)

*Primary Examiner* — Sonny Trinh
(74) *Attorney, Agent, or Firm* — Myers Bigel, P.A.

(57) ABSTRACT

A method for reducing power consumption of a mobile device comprises determining a link quality of a link for a transmission of data between the mobile device and a receiver and transmitting the data the data in dependence of the determined link quality from the mobile device to the receiver when the determined link quality is sufficiently high to allow a data transmission with a predetermined transmit power by the mobile device.

16 Claims, 2 Drawing Sheets

(58) Field of Classification Search
USPC ............... 455/574, 343.1, 343.2, 343.5, 522, 127.5,455/67.13, 452.2
See application file for complete search history.

(56) References Cited

U.S. PATENT DOCUMENTS

| | | | | |
|---|---|---|---|---|
| 7,411,491 | B2* | 8/2008 | Klabunde | ............. A61B 5/0006 |
| | | | | 340/539.1 |
| 7,483,710 | B2* | 1/2009 | Kitazawa | .............. H04W 52/20 |
| | | | | 455/13.4 |
| 7,653,408 | B1 | 1/2010 | Kopikare et al. | |
| 8,041,311 | B2* | 10/2011 | Shirakabe | ................ H04B 7/26 |
| | | | | 370/278 |
| 8,059,632 | B2* | 11/2011 | Xu | ........................ H04W 48/08 |
| | | | | 370/252 |
| 8,095,091 | B1 | 1/2012 | Kopikare | |
| 8,130,790 | B2* | 3/2012 | Sander | .................. H04J 3/1682 |
| | | | | 370/468 |
| 8,554,259 | B2* | 10/2013 | Ramasamy | ......... H04W 52/146 |
| | | | | 370/318 |
| 8,818,392 | B2* | 8/2014 | Chetlur | ................. H04L 5/0085 |
| | | | | 370/329 |
| 2007/0183355 | A1 | 8/2007 | Kuchibhotla et al. | |
| 2010/0069083 | A1 | 3/2010 | Wei et al. | |
| 2011/0002223 | A1* | 1/2011 | Gross | ...................... H04L 47/10 |
| | | | | 370/235 |
| 2012/0044897 | A1 | 2/2012 | Wager et al. | |

FOREIGN PATENT DOCUMENTS

| | | |
|---|---|---|
| WO | WO 00/72626 A1 | 11/2000 |
| WO | WO 2004/047379 A2 | 6/2004 |
| WO | WO 2004/100394 A1 * | 11/2004 ............. H04B 7/005 |

OTHER PUBLICATIONS

Communication with European Search Report, European Application No. 13000093.8, Aug. 29, 2013.
International Search Report, International Application No. PCT/EP2014/050284, Apr. 24, 2014.
Written Opinion of the International Searching Authority, International Application No. PCT/EP2014/050284, Apr. 24, 2014.

* cited by examiner

METHOD FOR REDUCING POWER CONSUMPTION OF A MOBILE DEVICE AND MOBILE DEVICE

CROSS REFERENCE TO RELATED APPLICATIONS

This application is a 35 U.S.C. §371 national stage application of PCT International Application No. PCT/EP2014/050284, filed on 9 Jan. 2014, which itself claims priority to European Application No. 13000093.8, filed 9 Jan. 2013, the disclosure and content of both of which are incorporated by reference herein in their entirety. The above-referenced PCT International Application was published in the English language as International Publication No. WO 2014/108461 A1 on 17 Jul. 2014.

The present invention relates to a method for reducing power consumption of a mobile device and a mobile device.

Many mobile devices, especially wireless mobile devices, smartphones and tablet computers, are battery powered. Based on the fact that the capacity of the battery is still limited due to size, weight and battery technologies, energy saving is an important issue in wireless communication because many mobile devices are dependent on access to energy. In order to decrease this dependency, it is necessary to decrease the power consumption in the mobile device.

Reducing power consumption can be achieved by a number of actions, which can be performed without any noticeable effect for the user, which means completely in the background, or can be performed with user configurable limitations with especially a loss in functionality, flexibility or performance.

Further, the total amount of power consumption in a mobile device is also dependent on how the mobile device is used by a user.

A lot of battery power of a mobile device is consumed in common user scenarios such as background traffic on a mobile network, for example during application of a push feature of a mailbox of the mobile device. In order to reduce data traffic on the mobile network, the data to be sent to the mobile device can be stored in a buffer on the network side during periods when the user is not active, for example when the phone is not used and is in a pocket. Then a scheduler sends the data according to a scheduled time or when the amount of data exceeds a preset limit. However, even with this measure it is still not possible to effectively reduce power consumption.

Therefore, there is a need to provide a simple, cheap and realizable method for reducing power consumption of a mobile device and a corresponding mobile device.

According to the present invention, this object is achieved by a method for reducing power consumption as defined in claim 1 and a mobile device as defined in claim 10. The dependent claims define preferred or advantageous embodiments of the present invention.

According to an aspect of the present invention, a method for reducing power consumption in a mobile device is provided, which comprises the steps of determining a link quality of a link for a transmission of data between the mobile device and a receiver, and transmitting the data in dependence of the determined link quality from the mobile device to the receiver when the determined link quality is sufficiently high to transmit the data with a predetermined transmit power from the mobile device to the receiver.

The communication with the receiver, for example a base station of a mobile communication network or another mobile device, requires a lower transmitter output power, and thus a lower power consumption, when the link quality is good or sufficiently high. This means that, when the link quality between the mobile device and the receiver is equal to or greater than a predetermined threshold value, the transmit power of the mobile device can be lowered to a predetermined power level, and nevertheless a reliable transmission of the data from the mobile device to the receiver can be ensured. According to an embodiment of the invention, the data is transmitted only if the link quality of the communication link between the mobile device and the receiver is equal to or greater than the predetermined threshold value. Thus, data transmission is avoided during periods in which the communication link has a poor link quality. Especially in use cases with many fading dips, a data transmission in such fading dips with a high transmit power can be avoided, and the current consumption can thereby be reduced.

Further, according to another embodiment of the invention, the data is transmitted only if the link quality between the mobile device and the receiver is equal to or greater than the predetermined threshold value over a predetermined time period. This ensures that, indeed, a stable high link quality can be used for the data transmission from the mobile device to the receiver.

According to a further embodiment, the data can be transmitted in dependence of the type of data or in dependence of the position of the mobile device in the corresponding mobile communication network comprising the mobile device and the receiver. For example, data or data types having a relatively high priority may be transmitted first, while the transmission of data or data types having a lower priority may be delayed until all data having a higher priority has been transmitted. In case the data is transmitted depending on the position of the mobile device, it is possible to transmit data from the mobile device to the corresponding receiver only if the mobile device is at a position in the communication network, which has a sufficiently high link quality.

According to another embodiment of the invention, the step of transmitting the data also comprises storing the data in a buffer if the determined link quality of the link is not sufficiently high and transmitting the data from the buffer to the receiver when the link quality of the link becomes sufficiently high. This means that, according to this embodiment, the data to be transmitted is buffered if the link quality is not sufficiently high to transmit the data with a predetermined (relatively low) transmit power, and the buffered data is read from the buffer and transmitted to the receiver as soon as the monitoring of the link quality shows that the link quality is sufficiently high.

According to a further embodiment of the invention, the data is transmitted from the buffer to the receiver irrespective of the current link quality if the buffer is full or if a buffer time of the data in the buffer exceeds a predetermined time limit, so that the buffer is emptied at least partly for future data transmissions.

Preferably, the method is performed for the data of non-real time applications of the mobile device, such as mailbox or SMS (short message service) applications of the mobile device, as such data do not require an immediate transmission to the receiver.

The method can further comprise the step of automatically detecting by the mobile device if the data to be transmitted to the receiver is data of a non-real time application and performing the method for reducing the power consumption of the mobile device only if the data to be transmitted is data of a non-real time application.

According to a further aspect of the present invention, a mobile device is provided, which comprises a transmitter for transmitting data to a receiver via a communication link, control means for determining a link quality of the link between the mobile device and the receiver and for controlling the transmitter to transmit the data to the receiver when the determined link quality is sufficiently high to transmit the data with a predetermined transmit power to the receiver.

The control means may be configured to control the transmitter to transmit the data to the receiver only when the link quality between the mobile device and the receiver is equal to or greater than a predetermined threshold value.

According to an embodiment of the invention, the mobile device may further comprise a buffer for storing the data if the link quality is not sufficiently high, and the control means may be configured to control the transmitter to transmit the data from the buffer to the receiver when the link quality of the link becomes sufficiently high.

Preferably, the mobile device, and in particular the control means thereof, is configured to perform the method according to the above described embodiments of the invention.

The mobile device may be a mobile device which allows a wireless data transmission and is selected from a group comprising a mobile phone, a personal digital assistant, and a mobile computer, such as a tablet computer, a notebook or a laptop computer. However, the invention is not restricted to these preferred applications and may be applied in general to any mobile device which allows a wired or wireless data transmission to a receiver.

Although specific features described in the above summary and in the following detailed description are described in connection with specific embodiments and aspects, it is to be understood that the features of the embodiments and aspects may be combined with each other unless specifically noted otherwise.

The invention will now be described in more detail with reference to the accompanying drawings.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

Figure 1:
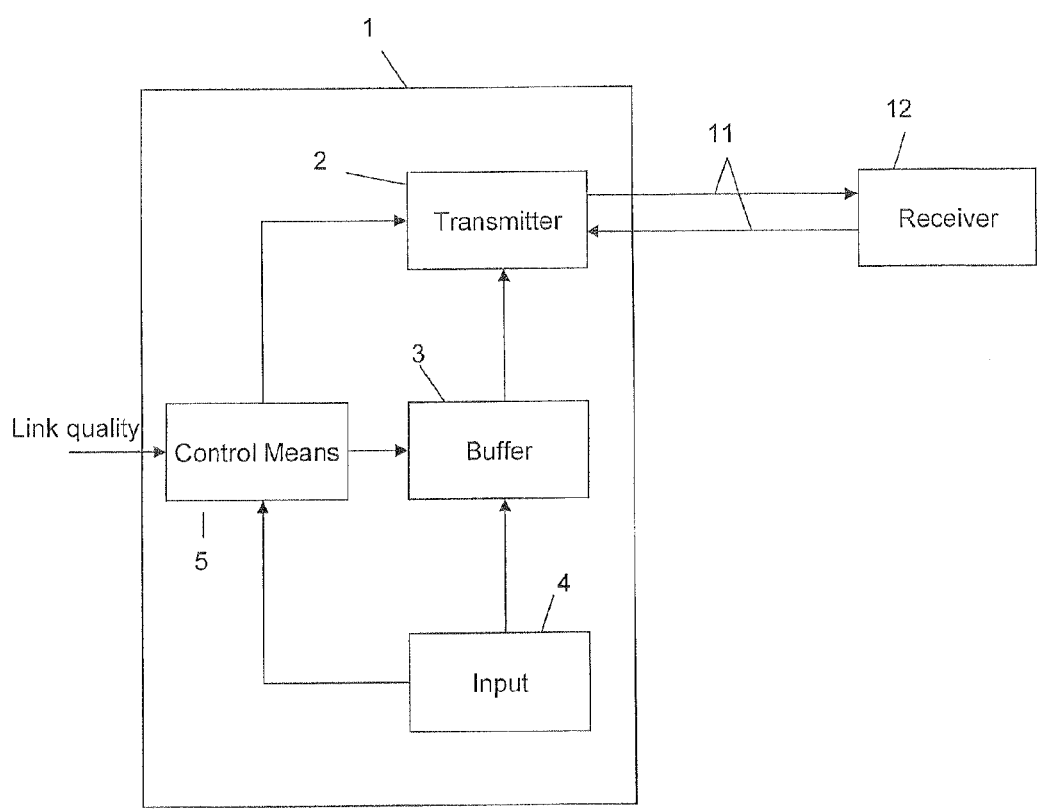
FIG. 1 shows schematically a mobile device according to an embodiment of the present invention.

FIG. 1 shows a mobile device 1, for example a mobile phone. The mobile device 1 comprises among other parts (not shown) a transmitter 2 for transmitting data to a receiver 12 via a communication link 11. According to a preferred embodiment of the invention, the mobile device also includes a receiver for receiving data via the link 11 or via a different communication link, so that the mobile device can transmit and receive data. The receiver 12 shown in FIG. 1 may be the base station of a corresponding wireless communication network. Alternatively, the receiver 12 may be another mobile device allowing a direct communication with the mobile device 1 shown in FIG. 1.

The output or transmit power level of the transmitter 2 is normally adjusted in order to obtain a correct link budget between the mobile device 1 and the receiver 12. The receiver 12 may measure a received signal quality and may control the output power level from the mobile device transmitter 2. This, for example, is the basis of Code Division Multiple Access (CDMA) communication systems.

During the transmission of data a large portion of the total power consumption in the mobile device 1 happens in the transmitter 2. The current consumption of the transmitter 2 is extremely dependent on the transmitted output power.

Therefore, the mobile device 1 comprises a control unit or control means 5 which determines a link quality of the link 11 between the mobile device 1 and the receiver 12 and controls the transmitter 2 to transmit data to the receiver 12 only when the determined link quality is sufficiently high to allow a data transmission with a predetermined transmit power. If the link quality between the mobile device 1 and the receiver 12 is sufficiently high, the data can directly be sent from the transmitter 2 to the receiver 12 via the link 11. If the link quality is not sufficiently high, the data is stored in a buffer 3, and the control means 5 controls the transmitter 2 to transmit the data from the buffer 3 to the receiver 12 as soon as the link quality of the link 11 becomes sufficiently high. The link quality may be determined based on a comparison with a predetermined threshold value. This means that the link quality is determined to be high enough if the link quality reaches or exceeds a predetermined threshold value, while in the other case the link quality is determined to be too low.

In particular, the threshold value is chosen such that it corresponds to a link quality value for which it is possible to reduce the transmit or output power of the transmitter 2 compared to conventional mobile devices and yet ensure a reliable data transmission to the receiver 12 so as to reduce the power consumption of the mobile device 1. For example, the threshold value may be chosen such that it corresponds to a transmit power of the transmitter 1 in the range of 10%-20% below the maximum output power of the transmitter 2.

In the embodiment of FIG. 1, the data to be transmitted to the receiver 12 is provided by an input section 4. The input section 4 may be any part of the mobile device 1, which is able to detect, generate, forward and/or process data, e.g. a keypad, a touchpad, a microphone, a sensor etc., or a software application running on the mobile device, e.g. an email client or an SMS application.

In a further embodiment of the invention, data is transmitted to the transmitter 2 only if the link quality between the mobile device 1 and the receiver 12 reaches or exceeds the predetermined threshold value over a predetermined period of time. For example, the predetermined period of time may be in the range of several minutes to ensure that there is a stable link quality of the communication link 11.

According to a further embodiment of the invention, the data may also be transmitted depending on the type of the data. For example, if the capacity of the buffer 3 is full, the data of e-mail and/or short message service (SMS) applications may be transmitted. Data can also be transmitted in dependence of a position of the mobile device 1, i.e., in dependence of the connectivity of the antenna of the mobile device. For example, if it is detected that the mobile device is being carried in a pocket of a user and, thus, has low connectivity, the control means 5 may cause the buffering of the data until the mobile device is in a position or location having a sufficiently good connectivity.

In general, the control means 5 may control the buffer 3 and the transmitter 2 such that the buffer 3 is at least partly emptied and the corresponding data read out of the buffer 3 is transmitted by the transmitter 2 if the buffer is full or if the data has been stored in the buffer for a predetermined buffer time, which may be in the range of several minutes. This may happen irrespective of the current link quality to allow that a sufficient storage capacity of the buffer is available at any time.

Figure 2:
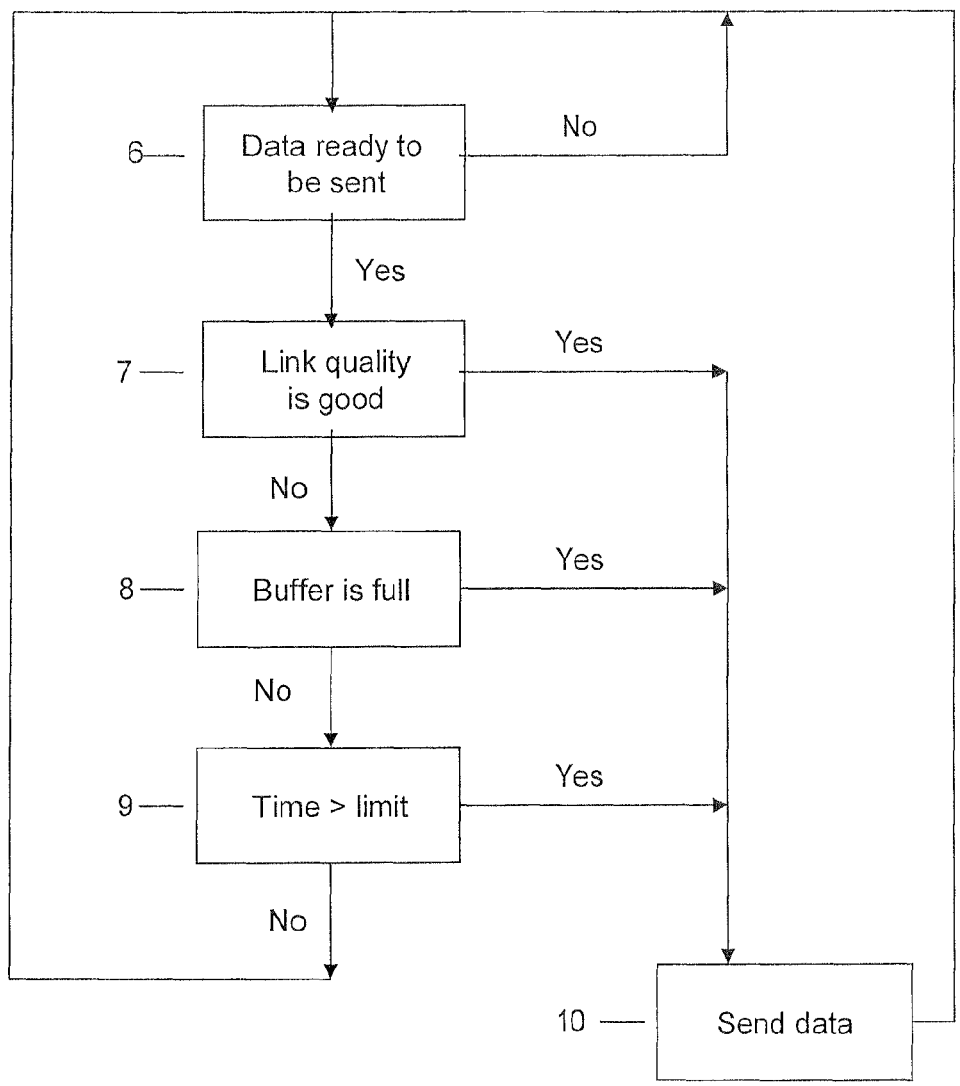
FIG. 2 shows method steps of a method according to an embodiment of the present invention.

FIG. 2 shows an embodiment of the method of the invention.

As shown in FIG. 2, in step 6, it is determined if data is ready to be sent to the receiver 12. If so, the link quality of the link 11 between the mobile device 1 and the receiver 12 is determined by the control means 5. If the link quality is good or sufficiently high (step 7), the data is sent from the mobile device 1 to the receiver 12 (step 10). Otherwise, the data to be transmitted is stored in the buffer 3.

If it is detected in step 8 that the buffer 3 is full, the data is read out from the buffer and transmitted to the receiver 12. This may happen irrespective of the current link quality. In addition, data can be read out from the buffer 3 and transmitted to the receiver 12 if the buffer time of the data in the buffer 3 exceeds a predetermined time limit, for example a time limit of 5 minutes (see step 9 in FIG. 2). Again, this may also happen irrespective of the current link quality of the link 11 between the mobile device 1 and the receiver 12 and irrespective of whether the capacity of the buffer is exhausted or not, The method and the mobile device of the invention can especially be used for data of non-real time applications, for example mailbox/email services or short message services. The mobile device 1 may be configured such that the control means 5 evaluate the data to be transmitted and automatically detect whether the data are data of a non-real time application. If so, the control means 5 may handle the data in conformity with the above described method of the invention.

The invention claimed is:

1. A method for reducing power consumption of a mobile device, the method comprising:
   determining a link quality of a link for a transmission of data between the mobile device and a receiver, and
   transmitting the data in dependence of the determined link quality from the mobile device to the receiver only when the determined link quality is sufficiently high to transmit the data with a predetermined transmit power from the mobile device to the receiver;
   wherein transmitting the data comprises storing the data in a buffer if the determined link quality of the link is not sufficiently high and transmitting the data from the buffer to the receiver when the link quality of the link becomes sufficiently high;
   wherein the data is transmitted from the buffer to the receiver irrespective of the link quality if the buffer is full or if a buffer time of the data in the buffer exceeds a predetermined time limit.

2. The method according to claim 1, wherein transmitting the data comprises transmitting the data only when the link quality between the mobile device and the receiver is equal to or greater than a predetermined threshold value.

3. The method according to claim 2, wherein transmitting the data comprises transmitting the data only when the link quality between the mobile device and the receiver is equal to or greater than the predetermined threshold value over a predetermined time period.

4. The method according to claim 1, wherein transmitting the data comprises transmitting the data in dependence of the type of data.

5. The method according to claim 1, wherein transmitting the data comprises transmitting the data in dependence of a position of the mobile device in a mobile communication network comprising the mobile device and the receiver.

6. The method according to claim 1, wherein the method is performed for the data of a non-real time application of the mobile device.

7. The method according to claim 6, further comprising:
   automatically detecting by the mobile device if the data to be transmitted to the receiver is data of a non-real time application and performing the method for reducing the power consumption of the mobile device if the data to be transmitted is data of a non-real time application.

8. The method of claim 1, further comprising:
   avoiding transmitting the data in dependence of the determined link quality from the mobile device to the receiver when the determined link quality is not sufficiently high to transmit the data with the predetermined transmit power from the mobile device to the receiver.

9. The method of claim 8, wherein determining the link quality comprises determining the link quality at the mobile device, and wherein transmitting the data comprises transmitting the data from the mobile device to the receiver over the link which comprises a wireless link.

10. A mobile device comprising:
    a transmitter configured to transmit data to a receiver via a link, and
    a controller configured to determine a link quality of the link between the mobile device and the receiver and to control the transmitter to transmit the data to the receiver only when the determined link quality is sufficiently high to transmit the data with a predetermined transmit power to the receiver;
    wherein the mobile device comprises a buffer configured to store the data if the link quality is not sufficiently high, and wherein the controller is configured to control the transmitter to transmit the data from the buffer to the receiver when the link quality of the link becomes sufficiently high;
    wherein the controller is configured to control the transmitter to transmit the data to the receiver irrespective of the link quality if the buffer is full or if a buffer time of the data in the buffer exceeds a predetermined time limit.

11. The mobile device according to claim 10, wherein the controller is configured to control the transmitter to transmit the data to the receiver only when the link quality between the mobile device and the receiver is equal to or greater than a predetermined threshold value.

12. The mobile device according to claim 11, wherein the mobile device comprises a buffer configured to store the data if the link quality is not sufficiently high, and wherein the controller is configured to control the transmitter to transmit the data from the buffer to the receiver when the link quality of the link becomes sufficiently high.

13. The mobile device according to claim 11, wherein the controller is configured to control the transmitter to transmit the data to the receiver when the link quality between the mobile device and the receiver is equal to or greater than the predetermined threshold value over a predetermined time period.

14. The mobile device according to claim 10, wherein the mobile device is a mobile device selected from a group comprising a mobile phone, a personal digital assistant, and a mobile computer.

15. The mobile device of claim 10 wherein the controller is further configured to avoid transmitting the data to the receiver when the determined link quality is not sufficiently high to transmit the data with the predetermined transmit power to the receiver.

16. The mobile device of claim 15, wherein the controller is configured to determine the link quality at the mobile device and to control the transmitter to transmit the data from the mobile device to the receiver over the link which comprises a wireless link.

* * * * *

UNITED STATES PATENT AND TRADEMARK OFFICE
CERTIFICATE OF CORRECTION

Page 1 of 1

PATENT NO.        : 9,554,332 B2
APPLICATION NO.   : 14/759832
DATED             : January 24, 2017
INVENTOR(S)       : Lönnblad et al.

It is certified that error appears in the above-identified patent and that said Letters Patent is hereby corrected as shown below:

On the Title Page

Item (30), Foreign Application Priority Data:
Please correct "13000093" to read -- 13000093.8 --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*